(12) United States Patent
Zheng et al.

(10) Patent No.: US 12,187,857 B2
(45) Date of Patent: Jan. 7, 2025

(54) ON-ORBIT RECYCLING METHOD FOR BUFFER FOAM OF CARGO SPACECRAFT

(71) Applicant: Sichuan Institute of Space Systems Engineering, Chengdu (CN)

(72) Inventors: Hansheng Zheng, Chengdu (CN); Yubin Yang, Chengdu (CN); Yi Zuo, Chengdu (CN); Lisheng Deng, Chengdu (CN); Shuxin Duan, Chengdu (CN); Yuehai Chen, Chengdu (CN); Wei Zhao, Chengdu (CN); Dan Li, Chengdu (CN); Peng Li, Chengdu (CN); Yiqian Cheng, Chengdu (CN); Yu Luo, Chengdu (CN)

(73) Assignee: Sichuan Institute of Space Systems Engineering, Chengdu (CN)

( * ) Notice: Subject to any disclaimer, the term of this patent is extended or adjusted under 35 U.S.C. 154(b) by 538 days.

(21) Appl. No.: 17/457,261

(22) Filed: Dec. 2, 2021

(65) Prior Publication Data
US 2023/0060920 A1    Mar. 2, 2023

(30) Foreign Application Priority Data

Aug. 31, 2021   (CN) .......................... 202111019257.8

(51) Int. Cl.
*C09J 175/04*     (2006.01)
*B64G 99/00*      (2009.01)
(Continued)

(52) U.S. Cl.
CPC .............. *C08J 11/06* (2013.01); *B64G 99/00* (2022.08); *B65B 5/067* (2013.01); *B65B 29/10* (2013.01);
(Continued)

(58) Field of Classification Search
CPC . B29C 44/182; B29C 44/183; B29C 67/0037; B31D 5/0078; B65B 29/10;
(Continued)

(56) References Cited

U.S. PATENT DOCUMENTS 3,114,722 A * 12/1963 Einhorn ..................... C08J 9/35
                                                    521/137
3,419,134 A * 12/1968 Fitts ..................... B65D 81/051
                                                    53/472

(Continued)

*Primary Examiner* — Joshua G Kotis
(74) *Attorney, Agent, or Firm* — Bayramoglu Law Offices LLC

(57) ABSTRACT

An on-orbit recycling method for a buffer foam of a cargo spacecraft includes the following steps: mechanically cutting a shaped PU foam into foam micro-blocks, and putting the foam micro-blocks into a packaging bag for packaging, where the packaging bag is filled with a foaming adhesive; the foaming adhesive includes a component A and a component B, which are independently packaged in a two-component packaging bag; and the component A and the component B are separated by a film; and squeezing the film between the component A and the component B, such that the two components are fully mixed, foamed and expanded to finally burst the two-component packaging bag, where after the packaging bag is burst, the foaming adhesive expands into gaps of the foam micro-blocks; and in a microgravity state of space, the foaming adhesive expands and fills uniformly in all directions and fully infiltrates the foam micro-blocks.

6 Claims, 1 Drawing Sheet

(51) Int. Cl.
*B65B 5/06* (2006.01)
*B65B 29/10* (2006.01)
*B65D 81/05* (2006.01)
*C08J 9/33* (2006.01)
*C08J 9/35* (2006.01)
*C08J 11/06* (2006.01)

(52) U.S. Cl.
CPC .............. *B65D 81/051* (2013.01); *C08J 9/33* (2013.01); *C08J 9/35* (2013.01); *C09J 175/04* (2013.01); *C08J 2375/04* (2013.01)

(58) Field of Classification Search
CPC ............... B65B 5/067; B29K 2105/26; B29K 2105/04; B29B 2017/044; B29B 2017/0444; B29B 2009/125; B29B 9/02; C08J 2375/04; C08J 2475/04; C08J 11/06; C08J 9/33; C08J 9/35; B64G 99/00
See application file for complete search history.

(56) References Cited

U.S. PATENT DOCUMENTS

| | | | | |
|---|---|---|---|---|
| 4,222,299 | A * | 9/1980 | Treffner | B26D 1/553 83/785 |
| 4,232,788 | A * | 11/1980 | Roth | B29C 44/183 264/45.2 |
| 4,421,526 | A * | 12/1983 | Strickman | A47K 7/03 51/296 |
| 4,574,677 | A * | 3/1986 | Huhne | B26D 1/553 83/171 |
| 5,899,325 | A * | 5/1999 | Bertram | B65B 9/213 53/450 |
| 6,675,557 | B2 * | 1/2004 | Sperry | B29C 44/60 53/472 |
| 6,712,201 | B1 * | 3/2004 | Bertram | B29C 44/183 206/219 |
| 6,996,956 | B2 * | 2/2006 | Sperry | B31D 5/0078 53/553 |
| 7,566,406 | B2 * | 7/2009 | Gilder | C08J 9/33 252/182.13 |
| 8,006,844 | B2 * | 8/2011 | McKinley | B65D 81/051 206/219 |
| 9,410,026 | B1 * | 8/2016 | Rees | C08J 9/33 |
| 10,085,872 | B2 * | 10/2018 | Huldin | A61L 15/12 |
| 2007/0039268 | A1 * | 2/2007 | Ambrose, Jr. | E04F 15/18 52/403.1 |
| 2009/0155477 | A1 * | 6/2009 | Chong | B05B 13/0442 118/612 |
| 2011/0300369 | A1 * | 12/2011 | Lesage | B29B 17/0042 428/304.4 |
| 2014/0134422 | A1 * | 5/2014 | Kraatz | B32B 25/10 264/46.4 |
| 2017/0258660 | A1 * | 9/2017 | Huldin | A61F 5/37 |
| 2019/0070051 | A1 * | 3/2019 | Bolzon | A61G 13/126 |
| 2020/0040153 | A1 * | 2/2020 | Vivian | C08J 9/02 |
| 2023/0227233 | A1 * | 7/2023 | Corradi | B29B 7/56 206/219 |

\* cited by examiner

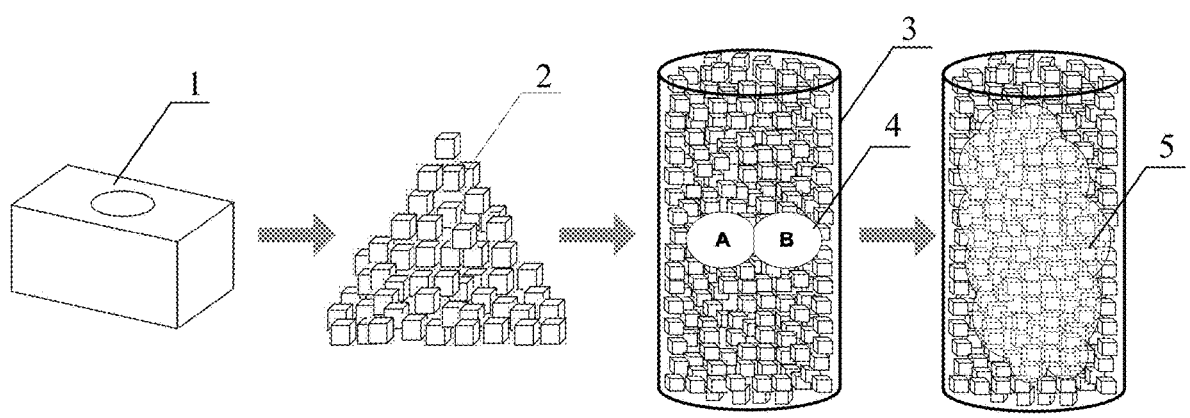

ON-ORBIT RECYCLING METHOD FOR BUFFER FOAM OF CARGO SPACECRAFT

CROSS REFERENCE TO THE RELATED APPLICATIONS

This application is based upon and claims priority to Chinese Patent Application No. 202111019257.8, filed on Aug. 31, 2021, the entire contents of which are incorporated herein by reference.

TECHNICAL FIELD

The present disclosure relates to the technical field of manned aerospace engineering, in particular to an on-orbit recycling method for a buffer foam of a cargo spacecraft.

BACKGROUND

As a buffer material, polymer foams have been maturely used in the field of cargo security for China's manned aerospace engineering. Buffer foams play an indispensable role in protecting the safety of cargo in the ascending cargo spacecraft, and they are mainly used to buffer key components by shock absorption in harsh mechanical environments of impact and vibration. At present, the buffer foams used in the aerospace field mainly include polyurethane (PU) and polyimide (PI) foams. Among them, the PU foams are suitable for the protection of high-end precision instruments and are currently the most widely used buffer foams in the aerospace field due to light weight, heat insulation, high shock resistance, high fatigue resistance, easy processing and design.

A large number of special PU foams are used in the cargo buffering packages of China's Tianzhou cargo spacecraft. After the spacecraft completes the cargo ascent task, a large number of buffer foams become on-orbit waste, bringing the problems of space occupation and difficult treatment. At present, at home and abroad, buffer foams are usually deorbited and burned off along with the cargo spacecraft, which causes a great waste of resources. As the cargo spacecraft will regularly supply materials for the space station, a large number of buffer foams are used during the long-term mission of the space station, which generates a recyclable and valuable space material resource.

The on-orbit manufacturing of materials and components, the recycling of on-orbit resources, and the utilization of extraterrestrial in-situ resources are important trends for the sustainable development of manned space flight projects in the future. Therefore, it is of great significance to recycle the huge buffer materials carried by the cargo spacecraft in orbit. The recovery and recycling of the on-orbit material are much more complicated than on the ground. The microgravity environment of space, the limited space and energy conditions of the spacecraft and the extremely high requirements for equipment safety in manned spaceflight pose many difficulties in the on-orbit recycling technology. At present, there is no report on a recycling method for a buffer material of a Chinese cargo spacecraft that is suitable for the special on-orbit environmental conditions.

SUMMARY

In order to solve the problem of on-orbit handling of special polyurethane (PU) foams used in a cargo spacecraft, the present disclosure proposes a recycling method that meets the requirements of the special on-orbit environment and resource constraint. The method can realize the secondary molding of the waste PU foam through bonding and recombination after micro-blocking treatment, without changing the excellent characteristics of the foam.

In order to achieve the above technical effect, the present disclosure provides the following technical solution.

An on-orbit recycling method for a buffer foam of a cargo spacecraft includes the following steps: mechanically cutting a shaped PU foam into foam micro-blocks, and putting the foam micro-blocks into a packaging bag for packaging, where the packaging bag is filled with a foaming adhesive; the foaming adhesive includes a component A and a component B, which are independently packaged in a two-component packaging bag; and the component A and the component B are separated by a film; and squeezing the film between the component A and the component B, such that the two components are fully mixed, foamed and expanded to finally burst the two-component packaging bag, where after the packaging bag is burst, the foaming adhesive expands into gaps of the foam micro-blocks; and in a microgravity state of space, the foaming adhesive expands and fills uniformly in all directions and fully infiltrates the foam micro-blocks, to finally complete bonding and curing.

In a further technical solution, the mechanical cutting is carried out by using a grid-shaped knife or a wire saw.

In a further technical solution, the foam micro-blocks each have a size of 5-20 mm.

In a further technical solution, the foam packaging bag is made of a polyimide (PI) film.

In a further technical solution, the component A of the foaming adhesive includes polyester polyol or polyether polyol, a surfactant, a foaming catalyst and distilled water, and the component B is an isocyanate.

In a further technical solution, the two-component packaging bag is made of a polyethylene (PE) film.

The technical solutions of the present disclosure are described in further detail below.

The recycling of the PU foam includes two aspects: recovery treatment and secondary utilization. The PU foam is a thermosetting polymer and cannot be recycled by melting. On-orbit operations implemented in manned spacecraft such as space stations have extremely high requirements for safety and resource costs. The physical and chemical recovery methods used in the industrial field on the ground have disadvantages such as high temperature, high pressure, release of harmful gases, and high energy consumption, and are not suitable for on-orbit environments.

Cargo buffer foams are protective parts of various shapes, and the feasible methods for on-orbit recovery treatment are mechanical cutting and micro-blocking treatment. Laser cutting, electrothermal cutting and other methods can also micro-block the PU foam. However, the high temperature during the cutting process will degrade the foam and release harmful gases into the cabin, which does not meet the safety requirements of the manned spacecraft cabin. The use of knives for mechanical cutting has no potential safety hazards such as high temperature and gas release, and is a feasible method suitable for on-orbit operations.

In order to realize the secondary utilization of the foam micro-blocks, the foam micro-blocks are cured and molded by bonding. Foaming and bonding are integrated, and the bonding agent is a two-component PU system of the same type that has excellent interface bonding capabilities for the PU foam. Relying on a small amount of foaming adhesives, the matching relationship between foaming and gelation rates is controlled to achieve high-efficiency and high-performance foaming and bonding effects. Compared with ground gravity conditions, the foaming adhesive has better interface wetting effects and better expansion and filling uniformity under microgravity, so as to achieve efficient and uniform secondary molding.

The waste PU foam micro-blocks are molded by foaming and bonding and can be used as a practical on-orbit manufacturing technology for future manned aerospace projects. For cargos that need to be returned to the ground with a returnable spacecraft, the recovered foam can be secondarily molded through foaming and bonding according to the shape of the cargos so as to protect the descending cargos from returning to the ground safely. In the longer term, this method can also be applied to the construction of living cabins on extraterrestrial planets. Special PU foam materials have excellent mechanical, thermal, fire-retardant, antibacterial and mildew-proof properties, so waste PU foam micro-blocks can be used as filling materials for the cabin structure of living cabins (such as flexible expandable cabins). After being molded by bonding and curing, the foam cabin structure has excellent thermal insulation. Adding an appropriate amount of additives with special functions to the foam cabin structure can also enhance the defense of the structure against high-energy particle radiation.

Compared with the prior art, the present disclosure has the following beneficial effects. The present disclosure can realize the secondary molding of waste foam materials and realize the recovery and secondary utilization of PU foams through bonding and recombination after micro-blocking treatment, without changing the excellent characteristics of the PU foam. The present disclosure realizes a safe and reliable recycling process that is free from pollution and harmful gases, which is feasible and suitable for on-orbit operation.

BRIEF DESCRIPTION OF THE DRAWINGS

FIGURE is a flowchart of a recycling method of a polyurethane (PU) foam.

1. Shaped PU foam; 2. Foam micro-blocks after cutting treatment; 3. Foam micro-block packaging bag; 4. Foaming and bonding two-component packaging bag; and 5. Foaming adhesive.

DETAILED DESCRIPTION OF THE EMBODIMENTS

The present disclosure is described in further detail below with reference to the drawings and specific examples.

Example 1

As shown in FIGURE, after a cargo spacecraft completes a cargo ascending task, a cargo package becomes waste. A buffer polyurethane (PU) foam 1 used in the bag has different shapes. A special mechanical tool is used to cut the PU foam into foam micro-blocks 2. The cutting tool can be a grid-shaped knife to improve cutting efficiency. The size of the foam micro-blocks 2 is optimized through experimental research. Present experimental research results show that cubic foam micro-blocks of about 10 mm have better foaming and bonding properties. The cut foam micro-blocks 2 are put into a foam packaging bag 3 for packaging. The foam packaging bag 3 is light, thin, elastic and airtight. The foam packaging bag may be made of a polyimide (PI) film, and the size of the foam packaging bag may be determined according to needs. The foaming and bonding technology uses a PU system including two components of the same type, which has excellent interface bonding capabilities to treat the waste PU foam. The original components of a foaming adhesive are filled in the foam packaging bag 3. A component A of the foaming adhesive includes polyether polyol 3050A, a silicone surfactant DC5188, an amine foaming catalyst 2040 and distilled water, and a component B thereof includes isocyanate M20s. These two components are independently packaged in a two-component packaging bag 4. The two-component packaging bag 4 is made of a polyethylene (PE) film. The two components of the foaming adhesive are separated by a film. By squeezing the film between the component A and the component B, the two components are fully mixed and a chemical reaction occurs to foam and expand. After expanding to a certain extent, the foaming adhesive 5 is generated to burst the two-component packaging bag 4 and expands into gaps of the foam micro-blocks. In the microgravity state of space, without the adverse effect of ground gravity, the foaming adhesive 5 expands and fills uniformly in all directions and fully infiltrates the foam micro-blocks to finally complete bonding and curing. Multiple foam packaging bags can be used to package cargos that need to descend back to the ground, and the descending cargos can be wrapped and shaped flexibly. The foam micro-blocks can also be put into an inflatable and expandable living cabin for filling and molding. When the cabin is launched into orbit, there is no need to carry a large number of additional foams, which greatly improves the economy.

The present disclosure is described above with reference to the illustrative embodiments of the present disclosure. However, these embodiments are only preferred embodiments of the present disclosure, and the embodiments of the present disclosure are not limited thereby. It should be understood that those skilled in the art can make many other modifications and implementations, but such modifications and implementations should fall within the scope of the principles and spirit disclosed herein.

What is claimed is:

1. An on-orbit recycling method for a buffer foam of a cargo spacecraft, comprising the following steps:
   mechanically cutting a shaped PU foam into cubic foam micro-blocks, and
   putting the cubic foam micro-blocks into an outer packaging bag for packaging, wherein the outer packaging bag is filled with a foaming adhesive;
   the foaming adhesive comprises a first component and a second component, and the first component and the second component are independently packaged in a two-component packaging bag; and
   the first component and the second component are separated by a film; and
   squeezing, in a microgravity state of space, the film between the first component and the second component to fully mix, foam and expand the first component and the second component and to finally burst the two-component packaging bag, wherein
      after the two-component packaging bag is burst, the foaming adhesive expands into gaps of the cubic foam micro-blocks, and
      the foaming adhesive, as a result of said burst in the microgravity state of space, expands and fills uniformly in all directions and fully infiltrates the cubic foam micro-blocks, to finally complete bonding and curing.

2. The on-orbit recycling method according to claim 1, wherein the mechanical cutting is carried out by using a grid-shaped knife or a wire saw.

3. The on-orbit recycling method according to claim 1, wherein the cubic foam micro-blocks each have a dimension with a size of 5-20 mm.

4. The on-orbit recycling method according to claim 1, wherein the outer packaging bag is made of a polyimide (PI) film.

5. The on-orbit recycling method according to claim 1, wherein the first component of the foaming adhesive comprises polyester polyol or polyether polyol, a surfactant, a foaming catalyst and distilled water, and the second component is an isocyanate.

6. The on-orbit recycling method according to claim 1, wherein the two-component packaging bag is made of a polyethylene (PE) film.

* * * * *